United States Patent Office 2,775,747
Patented Dec. 25, 1956

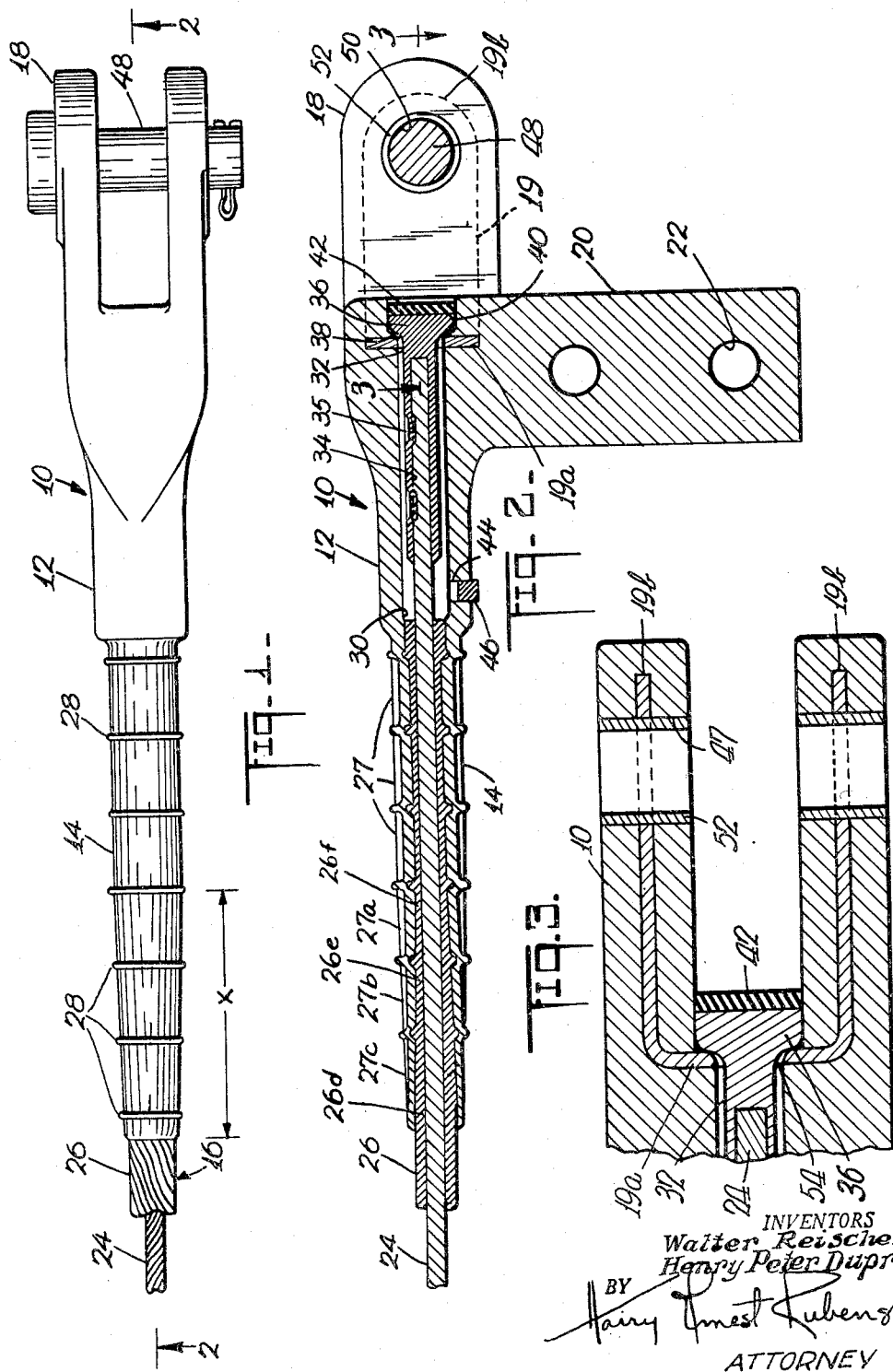

2,775,747

REINFORCED DEAD-END SPLICE CONNECTOR

Walter Reischer, New York, N. Y., and Henry Peter Dupre, Wilton, Conn., assignors to Burndy Engineering Co., Inc., a corporation of New York Application September 27, 1954, Serial No. 458,405

2 Claims. (Cl. 339—277)

Our invention relates to cable connectors and more particularly to connectors for anchoring the ends of composite transmission line cables to a supporting structure, and is an improvement of the connector patented by one of the applicants, as illustrated in Patent No. 2,668,280.

It is common in high power transmission lines to use an outer stranded cable conductor made of metal having high electrical conductivity such as aluminum over a reinforcing core of steel. An example is the aluminum cable with steel reinforcement (A. C. S. R.).

In the past, anchorage for this type of transmission line has been provided by connectors having two concentric sleeves of different lengths, the outer sleeve attached to the sheath conductor and the inner sleeve attached to the core. In the dead-end type of connector each sleeve terminates at the free end of the cable in a clevis, one within the other. Oppositely positioned holes in each clevis are aligned to take an anchor pin which attaches each cable member through its respective clevis to a supporting structure.

This type of connector has many disadvantages. For example, it is important in the use of composite cables for transmission lines that the stress on each member of the cable occur simultaneously to prevent an unbalanced strain. Each cable member being provided with its attached clevis must be aligned with one another and therefore a balanced stress is difficult to achieve.

Further, if a clevis is provided for both inner and outer cable members, there are four holes through which the anchor pin must be inserted. As the usual installation occurs on a transmission pole high above the ground and in an inconvenient position, it is awkward and time consuming to jockey the inner and outer clevises so that each pair of holes will be aligned to receive the anchor pin which is simultaneously secured to the eye of the usual strain insulator. A similar difficulty is encountered in removing the anchor pin where the uneven stress on the pin by the clevises causes it to stick until the holes are exactly aligned.

The object of the present invention is to retain all the benefits accomplished by the earlier patent, while reducing the bulk of the soft conductive metal required for transmitting the high electric tension, and for mechanically securing the reinforcing core, and to accomplish the foregoing in a device simple to manufacture, of relatively inexpensive material, and easy to handle and install.

These and other objects of our invention are accomplished and our new results obtained as will be apparent from the device described in the following specification, particularly pointed out in the claims, and illustrated in the accompanying drawing, in which:

Fig. 1 is a longitudinal plan view of our dead-end splice connector into which a transmission cable has been inserted.

Fig. 2 is a longitudinal sectional view taken along line 2—2 of Fig. 1 showing the connector indented to the cable members.

Fig. 3 is an enlarged fragmentary view in section taken through the plane 3—3 of Fig. 2.

In the drawing 10 designates a dead-end type of connector and comprises a body member 12, made of electrically conducting metal, preferably cast aluminum, terminating at one end in a hollow tubular portion 14 adapted to receive the composite cable 16, and at the other end in a clevis portion 18 having reinforcement 19 and adapted to secure the connector to a supporting structure, such as a strain insulator, not shown.

A contact arm 20 laterally extends from the body 12 to provide connection for a jumper lead, not shown. The arm may be a bar provided with attaching holes 22, as illustrated, or formed into a sleeve for attachment to a wire conductor.

The cable 16 may be the conventional high strength transmission type of A. C. S. R. cable, consisting of a steel core member 24 and an aluminum sheath conductor member 26.

The tubular portion 14 of the body receives the sheath conductor member 26 and is attached thereto, preferably by indentation 27, the guide lines 28 being provided to assist the workman in positioning the indenting tool and prevent overlapping of the indentations.

A substantial length of the tubular portion may be tapered toward its free end, illustrated by the distance X in Fig. 1, by reducing its thickness. When the tubular portion is indented to the sheath conductor member, as shown in Fig. 2, the indentations 27a, 27b and 27c in the tubular portion diminish in depth as the free end of the tubular portion is approached, whereas the wall thickness of the sheath conductor will be greatest at the free end of the tubular portion indicated at 26d and smallest at 26f. The depth of the indentation on the sheath conductor member is substantially the same as the corresponding indentation on the tubular portion, with allowance made for any slight longitudinal flow of the metal.

The tapered construction has a two fold advantage. Firstly, the strain on the connector is redistributed so that the greatest strain is furthermost from the free end or mouth of the tubular portion, which is the weakest point as it is the point where the connector first takes the load. Secondly, the effect of cable vibration is reduced by gradually relieving the "notched effect." The tensile strength of the sheath conductor member is gradually transferred to the tubular portion progressively from the mouth of the tubular portion.

The body 12 of the connector is bored at 30 to house a steel cap 32 having a socket portion 34 for attachment to the steel core 24, preferably by indentations 35.

A head 36 on the steel cap bears against a beveled shoulder 38 in the countersunk hole 40 in the body 12 to support the tensioned steel core. A washer 42 may be provided of rubber, steel, plastic or the like, and press-fitted into the hole 40 to assist in the sealing of the metal-to-metal contact of the head and shoulder within the body against corrosion. An opening 44 having a filler plug 46 may be provided in the body leading to the bore 30 into which a protective compound is injected to prevent oxidation of the metal parts.

The cable connection is made by inserting the dead-end connector over the cable allowing the end of the cable to extend beyond the aperture 40. The end of the sheath conductor 26 is stripped along its length sufficiently to permit the end of the core 24 to fit within the socket 34 of the cap 32 and is secured therein. The connector is then pulled back over the cable until the head 36 of the cap abuts the shoulder 38, and the tubular portion 14 of the body is indented to the sheath conductor 26. Finally the washer 42 is inserted into the body and the bore 30 filled with the protective compound through insert hole 44.

The reinforcement or core 19 comprises a U-shaped member having a base 19a joining legs 19b made of high strength metal, such as carbon steel. The core is placed inside the cast soft metal clevis during the casting process. The core is apertured as at 47, in both legs 19b, to receive the anchorage pin 48 used to mount the connector to a supporting structure, not shown, through apertures 50 formed in the legs 50a of clevis 18.

By imbedding the reinforcing core in the cast metal clevis, an ordinary steel core can be used. However, exposed tubing used for the shaft bearings is made of non-corrosive material, such as stainless steel.

The bearing surfaces 50 in the legs 18a of the clevis are preferably strengthened by short lengths of the tubing 52, which extend through the clevis and the reinforcing core. This tubing additionally supports the soft metal of the clevis, transmitting the stresses from the core directly to the anchorage pin 48. The tubing also prevents exposure of the ordinary steel core which may be used.

The base 19a of the reinforced cable is apertured at 54 to receive head 36 of the steel cap so as to transmit the stresses of the steel core of the cable directly to the anchorage pin.

The present invention reduces the size and weight of the soft metal clevis while substantially increasing the strength of the connection.

While we have illustrated the invention in a dead-end connector, it is to be understood that it may be incorporated in a cable splice for splicing cables of this type together, wherein each cable forms the supporting structure for the other.

We have thus described our invention, but we desire it understood that it is not confined to the particular forms or uses shown and described, the same being merely illustrative, and that the invention may be carried out in other ways without departing from the spirit of our invention, and, therefore, we claim broadly the right to employ all equivalent instrumentalities coming within the scope of the appended claims, and by means of which, objects of our invention are attained and new results accomplished, as it is obvious that the particular embodiments herein shown and described are only some of the many that can be employed to attain these objects and accomplish these results.

We claim:

1. In combination, a soft metal clevis having a pair of legs for anchoring a cable to an anchoring pin, and a reinforcing core comprising a U-shaped member made of metal having a high tensile strength positioned inside the body of the soft metal clevis, said clevis and reinforcing core provided with an aperture extending entirely therethrough for passing the cable end therethrough, and separate securing means larger than the diameter of the aperture in the core for external attachment to any selected cable, whereby a longitudinally applied force to the cable will position the securing means on the reinforcing core and hold the cable to the clevis.

2. In combination, a soft metal clevis having a pair of legs for anchoring a cable to an anchoring pin, and a reinforcing core comprising a U-shaped member made of metal having a high tensile strength positioned inside the body of the soft metal clevis, said clevis and reinforcing core having a pair of tubes made of metal having a high tensile strength, each tube extending transversely and entirely through each leg of the core and clevis and tightly secured to the reinforcing core for distributing the tensile stresses to the anchoring pin.

References Cited in the file of this patent

UNITED STATES PATENTS

| 1,895,533 | Bagley | Jan. 31, 1933 |
| 1,912,889 | Couse | June 6, 1933 |
| 2,043,512 | Hoover | June 9, 1936 |
| 2,157,453 | Jaeger | May 9, 1939 |
| 2,215,415 | Walcott | Sept. 17, 1940 |
| 2,618,675 | Lallmang | Nov. 18, 1952 |
| 2,668,280 | Dupre | Feb. 2, 1954 |